(12) United States Patent
Knauf (10) Patent No.: US 7,279,198 B1
(45) Date of Patent: *Oct. 9, 2007

(54) METHOD FOR EXTRUSION COATING A LIGHTWEIGHT WEB

(75) Inventor: Gary H. Knauf, Bear Creek, WI (US)

(73) Assignee: Thilmany LLC, Chicago, IL (US)

( * ) Notice: Subject to any disclaimer, the term of this patent is extended or adjusted under 35 U.S.C. 154(b) by 688 days.

This patent is subject to a terminal disclaimer.

(21) Appl. No.: 09/978,524

(22) Filed: Oct. 16, 2001

(51) Int. Cl.
*B05D 1/36* (2006.01)

(52) U.S. Cl. .............. 427/407.1; 264/171.13; 264/171.14; 264/173.12

(58) Field of Classification Search ............ 427/407.1; 264/171.13, 171.14, 173.12
See application file for complete search history.

(56) References Cited

U.S. PATENT DOCUMENTS

| | | | |
|---|---|---|---|
| 2,686,335 A | 8/1954 | Gross | |
| 2,690,633 A | 10/1954 | Denton | |
| 2,836,851 A | 6/1958 | Holt | |
| 3,230,135 A | 1/1966 | Hurst | |
| 3,385,026 A | 5/1968 | Schmermund | |
| 3,620,872 A * | 11/1971 | Whitchurch | 156/231 |
| 3,632,256 A | 1/1972 | Kasting et al. | |
| 3,650,880 A | 3/1972 | Tieniber | |
| 3,840,421 A * | 10/1974 | Peterson | 156/384 |
| 3,900,616 A | 8/1975 | Moore | |
| 3,996,728 A | 12/1976 | Gentili | |
| 4,233,358 A | 11/1980 | Jones et al. | |
| 4,254,173 A | 3/1981 | Peer, Jr. | |
| 4,362,585 A | 12/1982 | de Antonis | |
| 4,554,777 A | 11/1985 | Denk et al. | |
| 4,592,938 A | 6/1986 | Benoit | |
| 4,675,016 A | 6/1987 | Meuli et al. | |
| 4,759,816 A | 7/1988 | Kasper et al. | |
| 4,837,088 A | 6/1989 | Freedman | |
| 4,865,908 A | 9/1989 | Liu et al. | |
| 4,963,303 A * | 10/1990 | Anderson | 264/41 |
| 5,005,734 A | 4/1991 | Van Gordon | |
| 5,056,294 A | 10/1991 | Focke | |
| 5,175,978 A | 1/1993 | Knauf | |
| 5,250,348 A | 10/1993 | Knauf | |
| 5,360,629 A | 11/1994 | Milbourn | |
| 5,415,910 A | 5/1995 | Knauf | |
| 5,510,180 A | 4/1996 | Liu et al. | |
| 5,535,573 A | 7/1996 | Focke et al. | |
| 5,646,231 A * | 7/1997 | Marrocco et al. | 528/125 |
| 5,691,022 A | 11/1997 | Knauf | |
| 5,700,586 A | 12/1997 | Laiho et al. | |
| 6,080,252 A | 6/2000 | Plourde | |
| 6,150,005 A | 11/2000 | Knauf et al. | |
| 6,153,306 A | 11/2000 | Selin et al. | |
| 6,210,767 B1 | 4/2001 | Knauf | |
| 6,254,712 B1 * | 7/2001 | Enlow et al. | 156/244.11 |
| 6,656,401 B1 * | 12/2003 | Knauf | 264/146 |

* cited by examiner

*Primary Examiner*—Elena Tsoy
(74) *Attorney, Agent, or Firm*—Quarles & Brady LLP (57) ABSTRACT

The specification discloses a method for extrusion coating a lightweight web. According to the method, a length of a lightweight web along with a length of a carrier web is fed to an extruder with the lightweight web positioned atop the carrier web. A polymer film is then extruded onto the combined lightweight web and carrier web to provide an extrusion-coated lightweight web. Thereafter, the extrusion-coated lightweight is separated from the carrier web. Also disclosed are extrusion-coated lightweight webs formed according to the method.

27 Claims, 5 Drawing Sheets

METHOD FOR EXTRUSION COATING A LIGHTWEIGHT WEB

FIELD OF THE INVENTION

The invention relates to the field of web coatings and, in particular, to a system for extrusion coating a relatively lightweight web such as a lightweight paper or foil web.

BACKGROUND OF THE INVENTION

Webs, such as paper, paperboards, and polymer films which have been coated with an extruded polymer resin find use in numerous applications, particularly in packaging materials. In many such applications, it is the properties of the polymer coating which are most important such as heat sealing or the ability to provide a barrier against liquids or vapors. High strength and weight or bulk in the substrate web are sometimes of secondary importance, and a lightweight substrate may even be preferred in some applications.

Although lightweight webs with certain properties may be suitable or preferred in many applications, relatively heavyweight webs are often used because lighter materials cannot be satisfactorily processed in an extrusion coating process. The extrusion coating process subjects the web to relatively severe conditions including tension, exposure to hot molten extrudate, and high nip pressures while the web is transferred from an unwind roll, through the extruder, and onto a windup roll. As a result, attempts to extrusion coat lightweight substrate webs have resulted in excessive web breaks and unacceptable stretching and deformation of the substrate.

It is therefore an object of the invention to provide a method for extrusion coating lightweight web materials with a polymer coating.

Another object of the invention is to provide a relatively low basis weight, extrusion coated web.

Still another object of the invention is to provide a method of making a lightweight web having an extrusion coating without excess web breakage, deformation, or stretching during the extrusion process.

SUMMARY OF THE INVENTION

With regard to the foregoing and other objects and advantages, the present invention provides a method for extrusion coating a lightweight web, as hereinafter defined. According to the method, a length of a lightweight web is fed to an extruder along with a length of a carrier web with the lightweight web positioned atop the carrier web. A polymer film coating is then extruded onto the combined lightweight web and carrier web in the extruder so that a surface of the lightweight web is coated by the extruded coating to provide an extrusion-coated lightweight web. Thereafter, the extrusion-coated lightweight web is separated from the carrier web.

In another aspect, the invention relates to a coated web product including a lightweight web and a polymer coating extrusion coated thereon wherein the extrusion coated lightweight web is substantially undeformed.

In certain embodiments of the invention, it is preferred that the lightweight i=web have a width which is less than the width of the carrier web and is affixed to the carrier web by the polymer film coating.

In certain preferred embodiments the lightweight web is a nonwoven fabric. In other preferred embodiments, the lightweight web is a paper web. In still other preferred embodiments, the lightweight web is an oriented polymer film or a metal foil.

It is generally preferred that the carrier web is a heavyweight web. However, in certain embodiments the carrier web may be a second lightweight web.

Preferred polymers for use in the extrusion coating may be a film comprising a polymeric material selected from the group consisting of low density polyethylene (LDPE), polyolefin plastomers (POP), polyolefin elastomers (POE), linear low density polyethylene (LLDPE), high density polyethylene (HDPE), polypropylene (PP), ethylene methyl acrylate copolymer (EMA), ethylene butyl acrylate copolymer (EnBA), ethylene vinyl acetate copolymer (EVA), ethylene acrylic acid copolymer (EAA), ethylene methyl acrylic acid copolymer (EMAA), ionomoers such as SURLYN, ethylene vinyl alcohol (EVOH), polyesters such as polyethylene terephthalate (PET), and polyamides such as nylon-6 and nylon-6,6. Of course, the extruded coatings may contain various additives known to those of ordinary skill for various property enhancements/modifications, and the like. In certain embodiments, it may be preferred to coextrude multiple layers of the aforementioned polymers onto the carrier and lightweight webs.

BRIEF DESCRIPTION OF THE DRAWINGS

The above and other aspects and advantages of the invention will now be further described in conjunction with the accompanying drawings in which.

DETAILED DESCRIPTION OF THE INVENTION

The invention involves, in one respect, a method for extrusion coating a lightweight web. The invention also involves extrusion-coated lightweight webs.

According to the method aspects of the invention, a length of a lightweight, elongate web is combined with a length of a heavyweight carrier web such that the lightweight web is atop the carrier web. A polymeric material is then extrusion coated onto the surface of the lightweight web facing away form the carrier web so that at least a portion of the surface of the lightweight web becomes coated by the extruded coating. Thereafter, the extrusion-coated lightweight web and the carrier web are separated so as to provide an extrusion-coated lightweight web.

The invention is directed toward coating web substrates that cannot feasibly be extrusion-coated using known extrusion-coating systems because they cannot withstand the forces applied to them in these systems. Ordinarily, the inability of these material webs to undergo extrusion coating is due to their very light weight. For most material webs of the type that one may want to coat with a polymer film, the strength or ability of the web to undergo extrusion coating is a function primarily of its weight on some per unit basis (e.g., lbs/ream or lbs./3000 ft$^2$) and the nature and type of material. At some point for a given type of web material, one reaches a weight of material that is simply too light, delicate, etc. to allow the material to be extrusion coated using known extrusion coating equipment and systems which subject the incoming web material to fairly vigorous stresses, strains, and other forces as in the unwind steps when fed from a roll, nip stresses, and other such operations.

Accordingly, as used herein the terminology "lightweight" refers to webs which, due to their particular composition and nature, have insufficient strength to allow them to be effectively extrusion coated using existing or hereafter known extrusion systems and methods or which, due to other properties, have not heretofore been deemed suitable to be extrusion coated. Whether a web would be considered lightweight under this definition therefore depends on the type of material and how it is composed. For most materials, it is believed that they would be considered "lightweight" according to the invention if they exhibit undesirable deformations such as stretching and/or breaking when subjected to tensions of about 0.5 pli or less. Webs which may be subjected to tensions of over about 0.5 pli without exhibiting undesirable deformations can generally be extrusion coated alone using known systems and methods. Such webs are referred to herein as "heavyweight" webs.

For paper webs, lightweight webs according to the invention will typically have a basis weight up to about 17 lbs/3000 ft$^2$ and a caliper of about 1.4 mils or less. However, as a practical matter papers having a basis weight below about 10 lbs/3000 ft$^2$ are rarely encountered, so about 10 lbs/3000 ft$^2$ represents a practical minimum. For metal foils, such as aluminum foils, lightweight webs according to the invention typically have a basis weight up to about 21 lbs/3000 ft$^2$ and thickness or caliper of about 0.5 mils or less. Again, however, metal foils having a basis weight below about 7 lbs/3000 ft$^2$ are not typically encountered, so 10 lbs/3000 ft$^2$ represents a practical minimum for such materials. For oriented polymer films, lightweight webs according to the invention typically have a basis weight up to about 10 lbs/3000 ft$^2$ and a thickness or caliper of about 0.7 mils or less with about 4 lbs/3000 ft$^2$ representing a practical minimum. Lightweight webs according to the invention formed of non-woven textile fibrous materials (as distinguished from paper webs) typically have a basis weight up to about 15 lbs/3000 ft$^2$ with about 4 lbs/3000 ft$^2$ representing a practical minimum.

Figure 1:
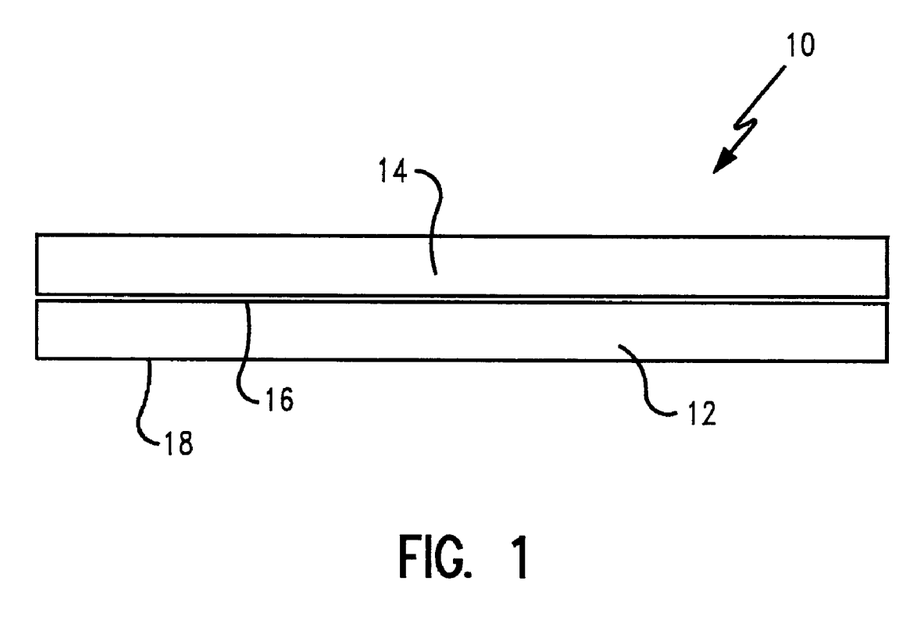
FIG. 1 is an enlarged, elevational view of a product according to one embodiment of the invention including a lightweight substrate web and a polymer coating layer thereon.

Referring now to the drawings, various aspects of one embodiment of the invention will now be described with reference to FIG. 1 wherein a product 10 according to the invention is shown including a lightweight web 12 and a polymeric layer 14 extrusion coated thereon. The lightweight web 12 is provided as a substantially continuous web having elongate, substantially parallel first and second surfaces 16, 18 and a thickness therebetween which is small in comparison to the length and width of the first and second surfaces. The web 12 may be formed from virtually any lightweight material as defined herein with regard to its amenability for withstanding the rigors of extrusion coating operations.

One principal aim of the invention is therefore to provide a coated lightweight web of this type carrying at least one layer of polymeric coating 14 on top of the substrate 12 applied thereto by an extrusion coating process, which is described in further detail hereinafter. Those of ordinary skill in the art will appreciate that the particular polymer used in the coating 14 may vary depending on the particular properties which are desired in final product 10 such as, for example, providing a vapor barrier or a liquid seal. Thus, the extruded coating or film on the web 12 may include a polymer selected from the group consisting of low density polyethylene (LDPE), polyolefin plastomers (POP), polyolefin elastomers (POE), linear low density polyethylene (LLDPE), high density polyethylene (HDPE), polypropylene (PP), ethylene methyl acrylate copolymer (EMA), ethylene butyl acrylate copolymer (EnBA), ethylene vinyl acetate copolymer (EVA), ethylene acrylic acid copolymer (EAA), ethylene methyl acrylic acid copolymer (EMAA), ionomoers such as SURLYN, ethylene vinyl alcohol (EVOH), polyesters such as polyethylene terephthalate (PET), and polyamides such as nylon-6 and nylon-6,6. If desired, multiple layers of one or more of the aforementioned polymers may be coextruded on the substrate 12 as well along with one or more additional layers.

The thickness and coating weight of the extruded polymer may also vary somewhat based on the particular application. For example, in the case of a low density polyethylene coating, the polymer coating 14 typically has a thickness of from about 0.21 mils to about 2.0 mils and a weight of from about 3 lbs/3000 ft$^2$ to about 29 lbs/3000 ft$^2$.

Importantly, the lightweight web 12 in the product 10 is substantially undeformed. That is, the web 12 exhibits only a minimal amount of undesired stretching and/or deformation from having undergone extrusion lamination. This lack of stretching may, for example, be quantified by measuring the amount of curl in the machine direction in the finished, coated product 10 according to TAPPI Standard Test UM 427. While zero observed curling is ideal, webs having a measured curl of up to about 3 inches are generally acceptable for most applications.

Extrusion-coated lightweight webs according to the present invention are well within this parameter, typically having a curl of less than one inch and often less than one half inch. This is in sharp contrast to the prior art wherein attempts to extrusion laminate such lightweight webs have resulted in the substrate being highly distorted if not destroyed and having measured curls far in excess of 3 inches.

Figure 3:
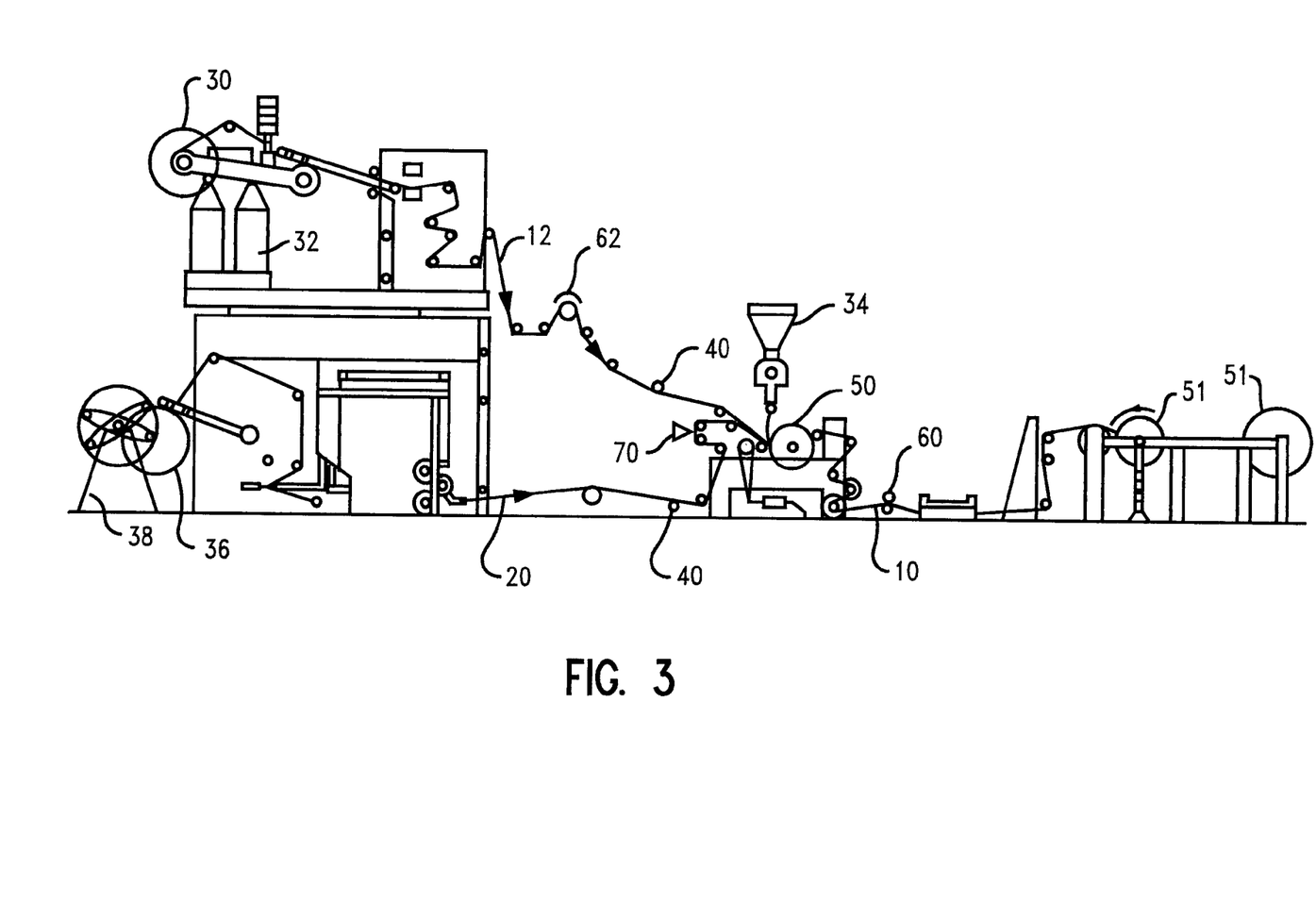
FIG. 3 is an elevational view of an extrusion station with accompanying web conveying apparatus suitable for use in practicing one embodiment of a method according to the invention.

According to the invention, the method for making the extrusion coated product 10 involves providing an essentially continuous length of the lightweight web 12, preferably in an uncoated form, as may be seen in FIG. 3. The length of lightweight web 12 is provided as a roll 30 which may be unwound from a first unwind stand 32 as needed to supply lightweight web 12 to the extruder 34. The rolls 30 typically will have a width of about 30 inches to about 110 inches and a total wound up length of about 10,000 feet to about 100,000 feet. However, it will be appreciated that there is no known limit to the width/length of the lightweight substrate outside of practical limitations inherent in the nature of the material and in extrusion systems for processing the same.

As noted above, the lightweight web 12 may be a non-woven fabric, a paper web, a polymer film, or a metal foil.

Examples of suitable rolls of such materials include SOFTEX nonwovens available from BBA Nonwoven, OTC Kraft paper available from International Paper, HICOR polymer films available from Exxon/Mobil, and 8111 metal foil available from Eurofoil.

A carrier web, most preferably a heavyweight carrier web 20, is also supplied.

As in the case of the lightweight web 12, the carrier web 20 is provided as a substantially continuous web having elongate, substantially parallel first and second surfaces 22, 24 and a thickness therebetween which is small in comparison to the length and width of the first and second surfaces 22, 24.

The carrier web 20 is preferably substantially heavier and thicker than the lightweight web 12, typically having a basis weight of from about 20 lbs/3000 ft$^2$ to about 120 lbs/3000 ft$^2$ and a thickness or caliper of from about 1.7 mils to about 10 mils. More preferably, the basis weight is from about 25 lbs/3000 ft$^2$ to about 50 lbs/3000 ft$^2$ and the thickness ranges from about 2.1 mils to about 4.2 mils. Because of its greater weight and thickness, the carrier web 20 is considerably stronger than the lightweight web 12, can be subjected to higher tension loads, and can be processed through an extruder 34 without breakage or substantial stretching or other undesirable deformation. Preferred materials for the carrier web 20 include heavy weight papers and polyethylene terephthalate (PET) films.

In certain embodiments, it is especially preferred that the carrier web 20 be supplied by a heavy, industrial paper material such as papers used in packaging/wrapping large manufactured goods. It will be appreciated that the carrier web material may be substantially unaffected by its use in the method and therefore may be reused or resold. In such cases, the carrier web may advantageously be marketed as a paper product "recycled" from post-industrial waste. The carrier web 20 is suitably provided, like the lightweight web 12, as a roll 36 which may be unwound from a second unwind stand 38 as needed.

It is also contemplated that carrier web 20 may be reused as a carrier in the method rather than being directed to secondary uses. In such case, the carrier web 20 may be supplied as a continuous loop or belt of web-like material which is conveyed in an endless cycle by a series of rollers or idlers. However, because of problems associated with buildup and spillage of polymer coating on to a reused carrier web, this embodiment may not be preferred.

If desired, the lightweight web 12 may be pretreated to prepare its surface for coating/enhance adhesion of the extruded material such as with an electric corona discharge unit 62 and/or by applying a tie layer such as by a spraying, rod coating, and other such processes.

As the lightweight web 12 is unwound from its roll, it is aligned or guided on top of the heavier carrier web 20. The two webs 10, 12 are then conveyed or fed into and through an extrusion station 34 without being significantly stretched by tension applied by the conveyer system. Most if not all of the tension applied by the machine operation is exerted upon the heavier carrier web 20 and the lightweight web 12 is carried along atop the carrier web 20. However, some degree of independent tensioning of the lightweight web 12 is desirable in order to avoid wrinkle formation as the webs pass through the extruder nip.

The two webs 12, 20 are then conveyed through an extruder station 34 such as a MILLENNIUM extruder available from Egan-Davis Standard of Somerville, N.J. In the extruder 34, which is shown in greater detail in FIG. 4, a polymer coating 14 is extruded over the top surfaces of the combined lightweight and carrier webs 12, 20.

Figure 2:
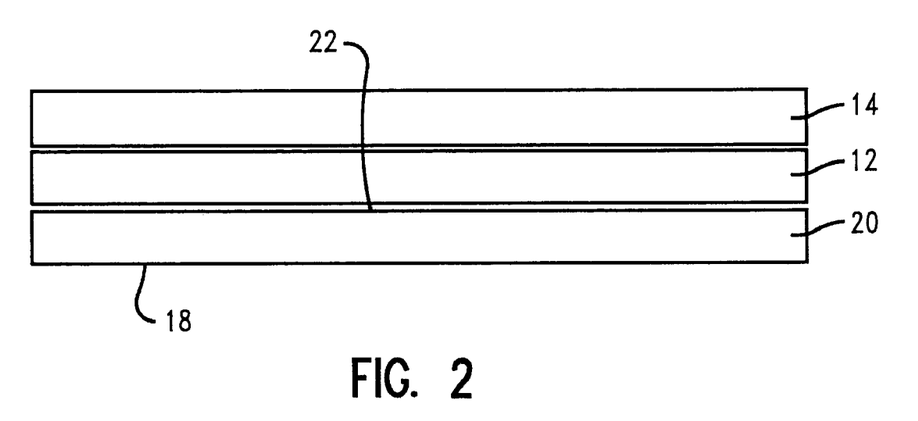
FIG. 2 is an elevational view depicting a three-part composite including a carrier web, a lightweight web atop the carrier web, and a polymer coating formed on the lightweight web in order to illustrate a step in a method of extrusion coating a lightweight web according to the invention.
Figure 4:
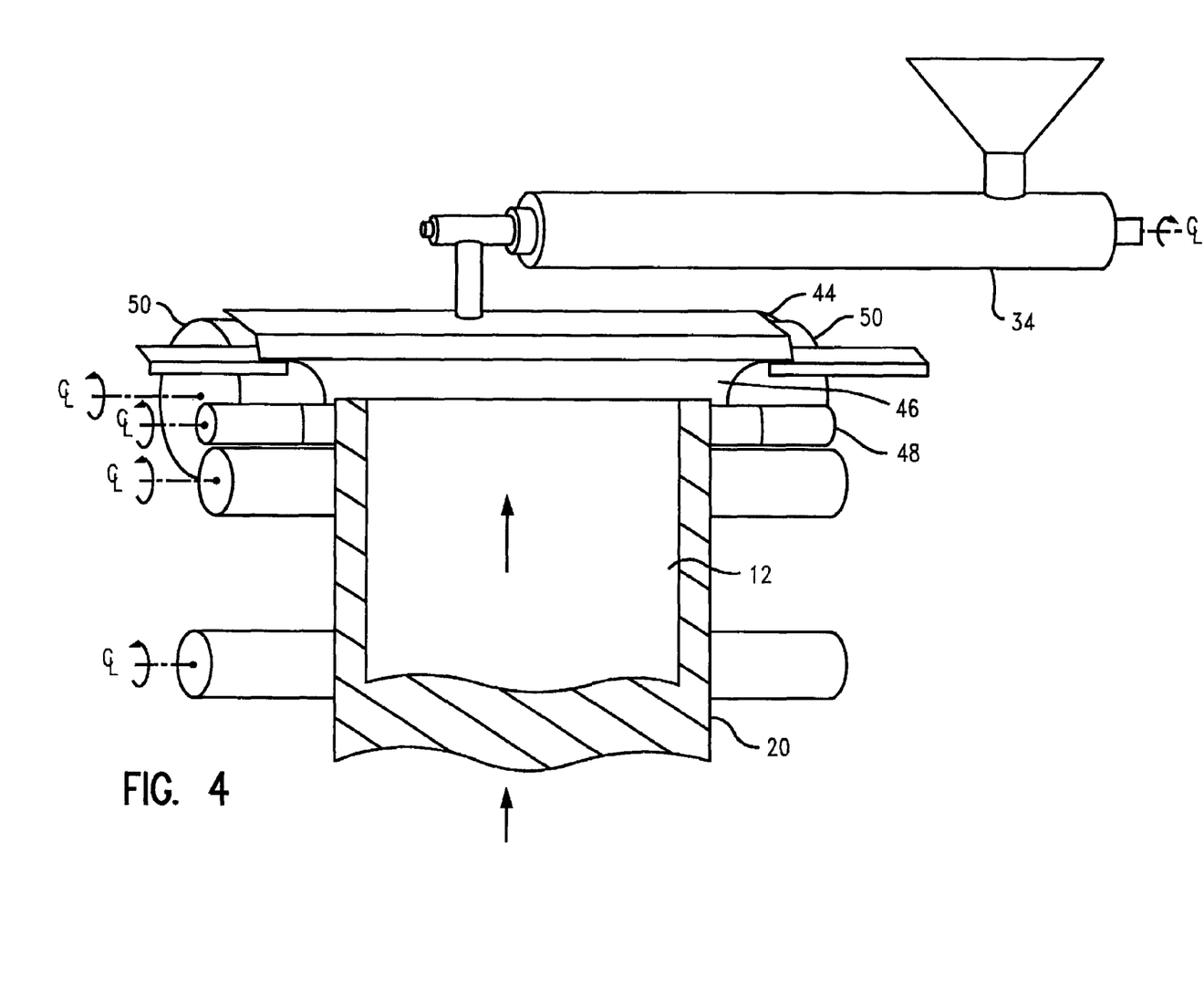
FIG. 4 is an enlarged elevational view of a portion of the extrusion station of FIG. 3 depicting the conveyance of combined webs through the station according to one embodiment of the invention.

In one embodiment of the invention in which the lightweight web 12 requires enhanced barrier properties, and in particular an enhanced water vapor barrier property, the polymeric coating 14 is most preferably low density polyethylene. Preferably, LDPE polymer is supplied in the form of pellets which are fed into a hopper and melt-blended. The molten polymer is then feed through an extrusion die 44 and a curtain 46 of the polymer is extruded onto the two webs 12, 20 as they pass through a nip in the extruder 34 formed by a backup roll 48 and chill roll 50. Contact between the curtain 46 and the chill roll 50 cools and solidifies the extrudate on the two webs 12, 20 to form a three part laminate as seen in FIG. 2.

According to typical extruder operations, the polymer is extruded at a feed rate of about 500 lb/hour to about 1000 lb/hour while the webs 12, 20 are conveyed at a speed of about 750 ft/minute to about 1500 feet/minute. This results in an extruded polymer coating 14 having a thickness of about 0.5 mils. However, it will be appreciated that polymer feed rate and the web travel rate may be varied so as to provide thicker or thinner polymer coatings.

One suitable extrusion coating method is described in commonly assigned application Ser. No. 10/721,957 entitled "Method for Extrusion Coating Multiple Webs" having the same inventor as the present application and being filed on even date herewith, the disclosure of which is hereby incorporated by reference.

After the polymer coating 14 has been extruded onto the webs, the lightweight web and the underlying carrier web are separated to provide the finished, extrusion-coated lightweight coated web product 10. In certain embodiments, it may be preferred to separate the combined webs upon exit from the extrusion station 34 in a single, continuous process by collecting the two webs on two separate windup stands. However, it is generally preferable to first collect the combined webs on an intermediate roll on a single windup stand 51 and then separate the product 10 and carrier web 20 in a separate process. In this manner, the webs can be stored intermittently on fewer rolls. Also, any downtime associated with the web separating process does not stop the extrusion process and vice versa. Moreover, this process is generally easier to implement on pre-existing extrusion lines which typically have only one windup stand. No further capital investment is required to modify the extrusion line by adding another windup stand.

For this arrangement, it is preferred that the lightweight web product 10 and carrier web 20 are temporarily affixed to one another as this will facilitate initially collecting both finished webs on a single windup stand for later separation using a rewinder. This allows automatic roll changes to be made at the windup stand at or near full line speed. For this purpose, the webs 10, 20 need only be joined along a portion of the webs 10, 20.

The webs may be temporarily joined by any of several methods. For instance, one or more edges of the two webs 10, 20 may be crimped together to hold them together by a suitable edge crimping device 60. The crimping may be accomplished at any point along the web path after the extrusion and prior to collection of the webs on a wind up stand.

Alternatively, an adhesive may be applied to one or both of the webs 12, 20. The adhesive may be applied by a sprayer 70 or other coating device. Advantageously, the coating or spray need only be applied just prior to making a roll change on the windup stand.

The webs 12, 20 may also be temporarily joined together by applying a static charge to one or both of the webs using a static charge device 40. The static charge may preferably be applied across the entire width of the web or webs.

It is most preferred, however, that the carrier web 20 be somewhat wider than the lightweight web 12 in the direction perpendicular to the web travel through the extruder 34, and extend out beyond both side or marginal edges of web 12. In this arrangement, it will be appreciated that the polymer coating will 14 overlay the entire upper surface of the lightweight web 12 and extend out beyond the side edges of web 12 directly onto the outer margins of the carrier web 20. This overlap of the polymer coating 14 will have the effect of temporarily adhering the lightweight web 10 to the carrier web 20 without requiring the use of static charges, crimping, or the like.

Figure 5:
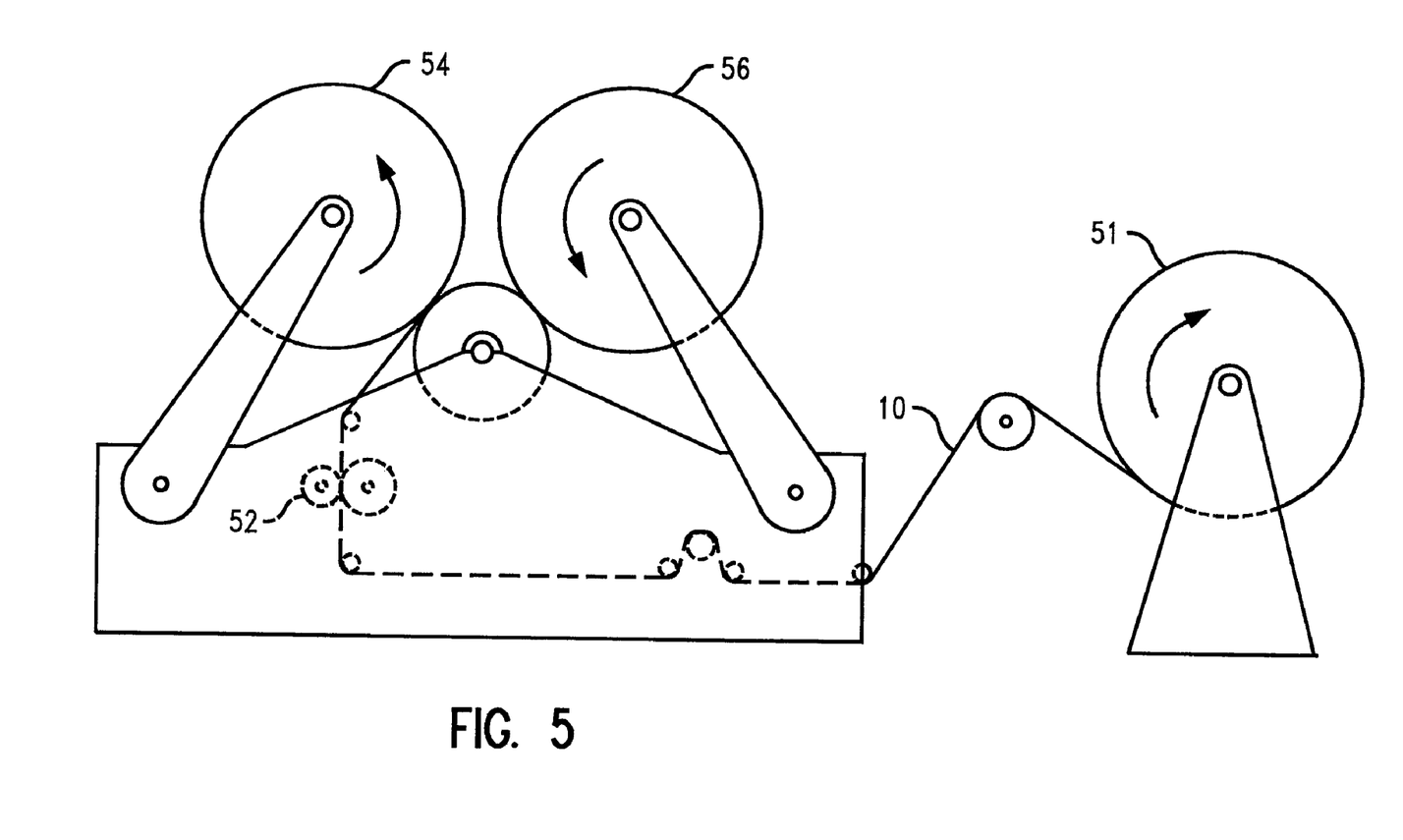
FIG. 5 is an elevational view of a rewinder for separating and collecting a carrier and an extrusion-coated lightweight web according to one embodiment of the invention.

In those embodiments wherein the carrier web 20 is wider than the lightweight web 12 and the web product 10 has been tacked down by its polymer coating 14 extending out onto the carrier web 20 or where the product and carrier webs 10, 20 have been affixed to one another by means of edge crimping, it is preferred that the two webs be separated using a duplex rewinder apparatus. In the rewinder, the combined webs 10, 20 from the single windup stand 51 are separated by passing the two webs 10, 20 through a slitting station 52 where a portion of the width of the product 10 containing the crimped edges or polymer overlap is trimmed away, thereby releasing the lightweight web product 10 from the carrier web 20. The product 10 is then preferably collected on a roll on a wind-up stand 54.

If the webs have been affixed by a static charge, a charge dissipation device may be employed to aid in separation of the webs 10, 20.

Finally, depending on the nature of the materials used for the carrier web 20 and web product 10 and their inherent compatibility/incompatibility, they may be wound together without any measure for adhering them together on the roll.

As noted above, it may be desired to convert the carrier web 20 into a post-industrial waste product after it is separated from the product 10. In such a case, the carrier web 20 is preferably collected on a separate windup roll 56.

Coated lightweight webs produced according to the invention may be used in numerous applications wherein a lightweight polymer coated web is desired, in particular the special attributes of an extrusion-coated film are necessary or desirable and not heretofore available on such lightweight webs. For instance, the invention may be used to provide lightweight food packaging materials including pouches for sugar and other sweeteners, wrappers for ice cream bars and other frozen confectionaries, and packets for cocoas and seasonings. Further potential uses include coated tissue papers, crepe papers, nonwovens, and metal foils, particularly aluminum foils.

The following nonlimiting examples are provided to further illustrate various aspects of the invention.

EXAMPLE 1

A web of lightweight aluminum foil substrate having a basis weight of about 12.1 lbs/3000 ft$^2$ and a caliper of about 0.285 mils and a width of about 20 inches was unwound from a roll and conveyed to an extrusion station by a series of rollers and idlers. A heavyweight carrier web consisting of kraft paper having a basis weight of about 31.5 lbs/3000 ft$^2$ and a width of about 30 inches was also unwound and conveyed to the extrusion station. The foil web substrate was centered atop the carrier web and passed through a 36 inch wide pilot scale extrusion coating line.

In the extruder, a supply of low density polyethylene tradename, 850-P, available from Eastman Chemical Co. of Longview, Tex. was heated to a temperature of about 610° F. to provide a supply of molten extrudate. The molten extrudate was then fed through an extrusion die at a feed rate of about 215 lbs/hr to coat the webs as they passed through the extrusion station. The extrudate was cooled by contacting with a chill roll to form a polymer coating over both the foil substrate and the heavier kraft paper carrier web. The polymer coating weight was about 8 lbs/3000 ft$^2$.

Samples of the coated foil product were cut away and separated from the kraft paper carrier web and tested for machine direction (MD) curl according to TAPPI Standard UM 427. The coated product had a MD curl of zero inches, measured to an accuracy of plus or minus 1/32 of one inch.

EXAMPLE 2

Using the same 36 inch pilot scale extrusion line as in Example 1, a lightweight substrate web of HDPE film having a basis weight of about 13.5 lbs/3000 ft$^2$ and a caliper of about 0.9 mils and a width of about 28.75 inches was unwound from a roll and conveyed to an extrusion station by a series of rollers and idlers. A heavyweight carrier web consisting of kraft paper having a basis weight of about 31.5 lbs 13000 ft$^2$ and a width of about 30 inches was also unwound and conveyed to the extrusion station. The HDPE film substrate was centered atop the carrier web and passed through the extrusion coating line.

In the extruder, a supply of low density polyethylene, tradename 850-P, available from Eastman Chemical Co. of Longview, Tex. was heated to a temperature of about 610° F. to provide a supply of molten extrudate. The molten extrudate was then fed through an extrusion die at a feed rate of about 215 lbs/hr to coat the webs as they passed through the extrusion station. The extrudate was cooled by contacting with a chill roll and formed a polymer coating over both the HDPE film substrate and the heavier kraft paper carrier. The polymer coating weight was about 8 lbs 13000 ft$^2$.

Samples of the coated HDPE film product were cut away and separated from the kraft paper and tested for MD curl according to TAPPI Standard UM 427. The coated product had a MD curl one half to one inches. In addition to being within the normally acceptable range of 3 inches or less, this amount of curl is particularly good for an HDPE product in that HDPE films have been found to be generally quite sensitive to heat shrinkage such as when contacting a hot, molten extrudate.

Having now described various aspects of the invention and preferred embodiments thereof, it will be recognized by those of ordinary skill that numerous modifications, variations and substitutions may exist within the spirit and scope of the appended claims.

What is claimed is:

1. A method for extrusion coating a lightweight web comprising:
    feeding a length of a nonwoven fabric, lightweight web along with a length of carrier web to an extruder with the lightweight web atop the carrier web;
    extruding a polymer film coating onto the lightweight web and carrier web in the extruder so that a surface of the lightweight web is coated by the extruded coating to provide an extrusion-coated lightweight web; and
    separating the extrusion-coated lightweight web from the carrier web.

2. The method of claim 1 wherein the lightweight web has a width less than a width of the carrier web and is affixed to the carrier web by the polymer film coating, and wherein a width of the polymer film coating is greater than the width of the lightweight web.

3. The method of claim 1 wherein the lightweight web exhibits deformations when subjected to a tension of about 0.5 pli or less.

4. The method of claim 1 wherein the polymer film coating comprises a polymer selected from the group consisting of low density polyethylene (LDPE), polyolefin plastomers (POP), polyolefin elastomers (POE), linear low density polyethylene (LLDPE), high density polyethylene (HDPE), polypropylene (PP), ethylene methyl acrylate copolymer (EMA), ethylene butyl acrylate copolymer (EnBA), ethylene vinyl acetate copolymer (EVA), ethylene acrylic acid copolymer (EAA), ethylene methyl acrylic acid copolymer (EMAA), ionomoers, ethylene vinyl alcohol (EVOH), polyesters such as polyethylene terephthalate (PET), polyamides, and one or more of the foregoing.

5. The method of claim 1 wherein the lightweight web has a MD curl of less than about 3 inches as measured by TAPPI UM 427.

6. The method of claim 1 wherein the lightweight web has insufficient strength properties in the absence of the underlying carrier web to withstand forces imposed upon it in an extruder coating station.

7. The method of claim 1 wherein the carrier web is a heavyweight web.

8. The method of claim 1 wherein the carrier web is a second lightweight web.

9. The method of claim 1 wherein the polymer film coating comprises a coextrusion of at least two layers of polymer films.

10. A method for extrusion coating a lightweight web comprising:
feeding a length of a paper, lightweight web along with a length of carrier web to an extruder with the lightweight web atop the carrier web;
extruding a polymer film coating onto the lightweight web and carrier web in the extruder so that a surface of the lightweight web is coated by the extruded coating to provide an extrusion-coated lightweight web; and
separating the extrusion-coated lightweight web from the carrier web.

11. The method of claim 10 wherein the lightweight web has a width less than a width of the carrier web and is affixed to the carrier web by the polymer film coating, and wherein a width of the polymer film coating is greater than the width of the lightweight web.

12. The method of claim 10 wherein the lightweight web exhibits deformations when subjected to a tension of about 0.5 pli or less.

13. The method of claim 10 wherein the polymer film coating comprises a polymer selected from the group consisting of low density polyethylene (LDPE), polyolefin plastomers (POP), polyolefin elastomers (POE), linear low density polyethylene (LLDPE), high density polyethylene (HDPE), polypropylene (PP), ethylene methyl acrylate copolymer (EMA), ethylene butyl acrylate copolymer (EnBA), ethylene vinyl acetate copolymer (EVA), ethylene acrylic acid copolymer (EAA), ethylene methyl acrylic acid copolymer (EMAA), ionomoers, ethylene vinyl alcohol (EVOH), polyesters such as polyethylene terephthalate (PET), polyamides, and one or more of the foregoing.

14. The method of claim 10 wherein the lightweight web has a MD curl of less than about 3 inches as measured by TAPPI UM 427.

15. The method of claim 10 wherein the lightweight web has insufficient strength properties in the absence of the underlying carrier web to withstand forces imposed upon it in an extruder coating station.

16. The method of claim 10 wherein the carrier web is a heavyweight web.

17. The method of claim 10 wherein the carrier web is a second lightweight web.

18. The method of claim 10 wherein the polymer film coating comprises a coextrusion of at least two layers of polymer films.

19. A method for extrusion coating a lightweight web comprising:
feeding a length of a metal foil, lightweight web along with a length of carrier web to an extruder with the lightweight web atop the carrier web;
extruding a polymer film coating onto the lightweight web and carrier web in the extruder so that a surface of the lightweight web is coated by the extruded coating to provide an extrusion-coated lightweight web; and
separating the extrusion-coated lightweight web from the carrier web.

20. The method of claim 19 wherein the lightweight web has a width less than a width of the carrier web and is affixed to the carrier web by the polymer film coating, and wherein a width of the polymer film coating is greater than the width of the lightweight web.

21. The method of claim 19 wherein the lightweight web exhibits deformations when subjected to a tension of about 0.5 pli or less.

22. The method of claim 19 wherein the polymer film coating comprises a polymer selected from the group consisting of low density polyethylene (LDPE), polyolefin plastomers (POP), polyolefin elastomers (POE), linear low density polyethylene (LLDPE), high density polyethylene (HDPE), polypropylene (PP), ethylene methyl acrylate copolymer (EMA), ethylene butyl acrylate copolymer (EnBA), ethylene vinyl acetate copolymer (EVA), ethylene acrylic acid copolymer (EAA), ethylene methyl acrylic acid copolymer (EMAA), ionomoers, ethylene vinyl alcohol (EVOH), polyesters such as polyethylene terephthalate (PET), polyamides, and one or more of the foregoing.

23. The method of claim 19 wherein the lightweight web has a MD curl of less than about 3 inches as measured by TAPPI UM 427.

24. The method of claim 19 wherein the lightweight web has insufficient strength properties in the absence of the underlying carrier web to withstand forces imposed upon it in an extruder coating station.

25. The method of claim 19 wherein the carrier web is a heavyweight web.

26. The method of claim 19 wherein the carrier web is a second lightweight web.

27. The method of claim 19 wherein the polymer film coating comprises a coextrusion of at least two layers of polymer films.

* * * * *

UNITED STATES PATENT AND TRADEMARK OFFICE
CERTIFICATE OF CORRECTION

PATENT NO. : 7,279,198 B1
APPLICATION NO. : 09/978524
DATED : October 9, 2007
INVENTOR(S) : Gary Knauf Page 1 of 1

It is certified that error appears in the above-identified patent and that said Letters Patent is hereby corrected as shown below:

Column 8, Line 28:
"13000" should be
--3000--

Signed and Sealed this

Twenty-sixth Day of February, 2008

JON W. DUDAS
*Director of the United States Patent and Trademark Office*